(12) United States Patent
Gomez et al.

(10) Patent No.: US 11,017,091 B2
(45) Date of Patent: *May 25, 2021

(54) FIRMWARE MAP DATA

(71) Applicant: HEWLETT PACKARD ENTERPRISE DEVELOPMENT LP, Houston, TX (US)

(72) Inventors: Erick Gomez, Houston, TX (US); Jason H Fay, Austin, TX (US); Vartan Kasheshian, Houston, TX (US); Uchenna Edeh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/503,891

(22) Filed: Jul. 5, 2019

(65) Prior Publication Data

US 2019/0332776 A1 Oct. 31, 2019

Related U.S. Application Data

(63) Continuation of application No. 15/564,690, filed as application No. PCT/US2015/026428 on Apr. 17, 2015, now Pat. No. 10,387,652.

(51) Int. Cl.
 *G06F 21/00* (2013.01)
 *G06F 21/57* (2013.01)
 (Continued)

(52) U.S. Cl.
 CPC .............. *G06F 21/572* (2013.01); *G06F 8/36* (2013.01); *G06F 8/63* (2013.01); *G06F 8/654* (2018.02);
 (Continued)

(58) Field of Classification Search
 CPC .......... G06F 21/572; G06F 8/63; G06F 8/654; G06F 21/78; G06F 21/552; G06F 21/565;
 (Continued)

(56) References Cited

U.S. PATENT DOCUMENTS

| | | | |
|---|---|---|---|
| 5,802,592 | A | 9/1998 | Chess et al. |
| 7,536,540 | B2 | 5/2009 | Holtzman et al. |

(Continued)

FOREIGN PATENT DOCUMENTS

WO 2012/148422 A1 11/2012

OTHER PUBLICATIONS

Wang et al., "Vulnerability and Protocol Association of Device Firmware in Power Grid", 2018 Electrical Power, Electronics, Communications, Controls and Informatics Seminar (EECCIS), Date of Conference: Oct. 9-11 (Year: 2018).*

(Continued)

*Primary Examiner* — Morshed Mehedi
(74) *Attorney, Agent, or Firm* — Dhand Law PC

(57) ABSTRACT

An example method includes retrieving, based on firmware map data stored in a firmware map, first portions of a system firmware while omitting retrieval of second portions to form a combined portion. The firmware map data is indicative of the first portions of the system firmware that remain unchanged over a normal lifetime of the system firmware, and the firmware map data is also indicative of the second portions of the system firmware that may vary over the normal lifetime of the system firmware. The method further includes calculating at least one master hash code based on the combined portion, and storing the at least one master hash code in a hash code table in association with the firmware map data.

8 Claims, 4 Drawing Sheets

(51) Int. Cl.
*G06F 21/51* (2013.01)
*G06F 8/654* (2018.01)
*G06F 8/36* (2018.01)
*G06F 8/61* (2018.01)
*G06F 21/56* (2013.01)
*G06F 21/55* (2013.01)
*G06F 21/78* (2013.01)
*G06F 8/71* (2018.01)

(52) U.S. Cl.
CPC ............ *G06F 21/51* (2013.01); *G06F 21/552* (2013.01); *G06F 21/565* (2013.01); *G06F 21/575* (2013.01); *G06F 21/78* (2013.01); *G06F 8/71* (2013.01); *G06F 2221/033* (2013.01)

(58) Field of Classification Search
CPC .......... G06F 8/36; G06F 21/575; G06F 21/51; G06F 8/71; G06F 2221/033
See application file for complete search history.

(56) References Cited

U.S. PATENT DOCUMENTS

| | | | | |
|---|---|---|---|---|
| 8,068,614 B2* | 11/2011 | Kumar | ................. | G06F 21/575 380/285 |
| 9,569,617 B1 | 2/2017 | Chen | | |
| 2003/0229777 A1* | 12/2003 | Morais | ................. | G06F 21/575 713/2 |
| 2004/0268339 A1 | 12/2004 | Van et al. | | |
| 2007/0061581 A1* | 3/2007 | Holtzman | ............... | G06F 21/78 713/176 |
| 2008/0082447 A1* | 4/2008 | Jogand-Coulomb | ... | G06F 21/78 705/53 |
| 2008/0244553 A1 | 10/2008 | Cromer et al. | | |
| 2008/0313453 A1 | 12/2008 | Booth et al. | | |
| 2009/0172822 A1* | 7/2009 | Sahita | ................... | G06F 21/575 726/27 |
| 2012/0190441 A1 | 7/2012 | Crowder, Jr. | | |
| 2013/0111591 A1 | 5/2013 | Topan et al. | | |
| 2013/0212406 A1 | 8/2013 | Datta et al. | | |
| 2013/0246378 A1 | 9/2013 | Hearnden et al. | | |
| 2014/0331038 A1 | 11/2014 | Batke et al. | | |
| 2014/0337610 A1* | 11/2014 | Kawano | ................. | G06F 9/441 713/2 |
| 2016/0182238 A1* | 6/2016 | Dewan | ................. | H04L 9/3242 713/171 |
| 2017/0010875 A1 | 1/2017 | Martinez et al. | | |

OTHER PUBLICATIONS

Champagne et al., "Scalable Architectural Support for Trusted Software", HPCA—16 2010 the Sixteenth International Symposium on High-Performance Computer Architecture, Date of Conference: Jan. 9-14 (Year: 2010).

European Search Report and Search Opinion Received for EP Application No. 15889393.3, dated Feb. 13, 2018, 6 pages.

International Search Report and Written Opinion received for PCT Patent Application No. PCT/US2015/026428, dated Feb. 24, 2016, 8 pages.

Park, D. et al., A Safe Microcontroller with Silent CRC Calculation Hardware for Code ROM Integrity Verification in IEC-60730 Class-B, (Research Paper), Aug. 1, 2012, 4 Pages.

* cited by examiner

FIRMWARE MAP DATA

CROSS-REFERENCE TO RELATED APPLICATION

This application is a Continuation of U.S. application Ser. No. 15/564,690, filed on Oct. 5, 2017, which is the National Stage of International Application No. PCT/US2015/026428, filed on Apr. 17, 2015, the content of which are incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND

Modern computer systems typically include a read-only memory (ROM) to store various types of information, such as operating system routines. Certain computer systems include electronically programmable non-volatile memories which may include various device technologies such as electronically erasable programmable read-only memory (EEPROM) or Flash, for example.

BRIEF DESCRIPTION OF THE DRAWINGS

For a more complete understanding of various examples, reference is now made to the following description taken in connection with the accompanying drawings in which:

FIG. 0 illustrates an example server device that may utilize a firmware inspector module;

DETAILED DESCRIPTION

Example systems and methods described herein may be used to verify the ROM firmware in production environments for any computing device. The example systems and methods may be used to verify that the system ROM firmware has not been tampered with, thus protecting against threats including malware, Trojan Horses and viruses in computing devices such as servers. Various methods include generating a master hash code using a hash algorithm such as a version of the Secure Hash Algorithm (e.g., SHA256) for multiple system ROM families. In various examples, a mapping table is developed that identifies chosen portions of the system ROMs in order to calculate the binary data from multiple different system ROMs that include various specialized code from many different Original Equipment Manufacturers or OEMs. The mapping table, in various examples, may be an embedded table of information for each server system, including different system ROM families and different system ROM versions within each ROM family. Using methods described herein, a user can easily detect whether their server system ROMs are compliant are original ROM images or whether they have been tampered with.

The mapping tables may, in various examples, include static portions that are common to all versions from different OEMs and may exclude variable portions that may be expected to be legitimately modified by OEMs and the like. The mapping table may be based on a mapping of the binary ROM file sections to system ROM locations. These ROM file sections may be verified against the production binary sections by computing a checksum or hash code (referred to from herein as a hash code without loss of generality) for each ROM section and comparing it with a master hash code from the verified master system ROM. The method may be fully automated. A user may only need to run the ROM verification tool to compare the user's system ROM with the stored hash codes from the master ROM to validate the authenticity and integrity. The verification may be accomplished during production of the computing device, during system updates, etc.

Currently, there is no reliable and simple way to detect that a computer operating system contained in read-only-memory (ROM) has not been tampered with by hackers. What is needed is a method to check and validate the installed system ROM image of a computing device and validate its integrity. Currently there is no way to detect or inspect an installed system ROM. The only currently reliable method for curing a system ROM that has been tampered with is re-flashing the system ROM with a new system ROM image when a user suspects that something could be wrong. There is no known method of verifying the integrity of the active production system ROMs without a need to re-flash.

Figure 1:
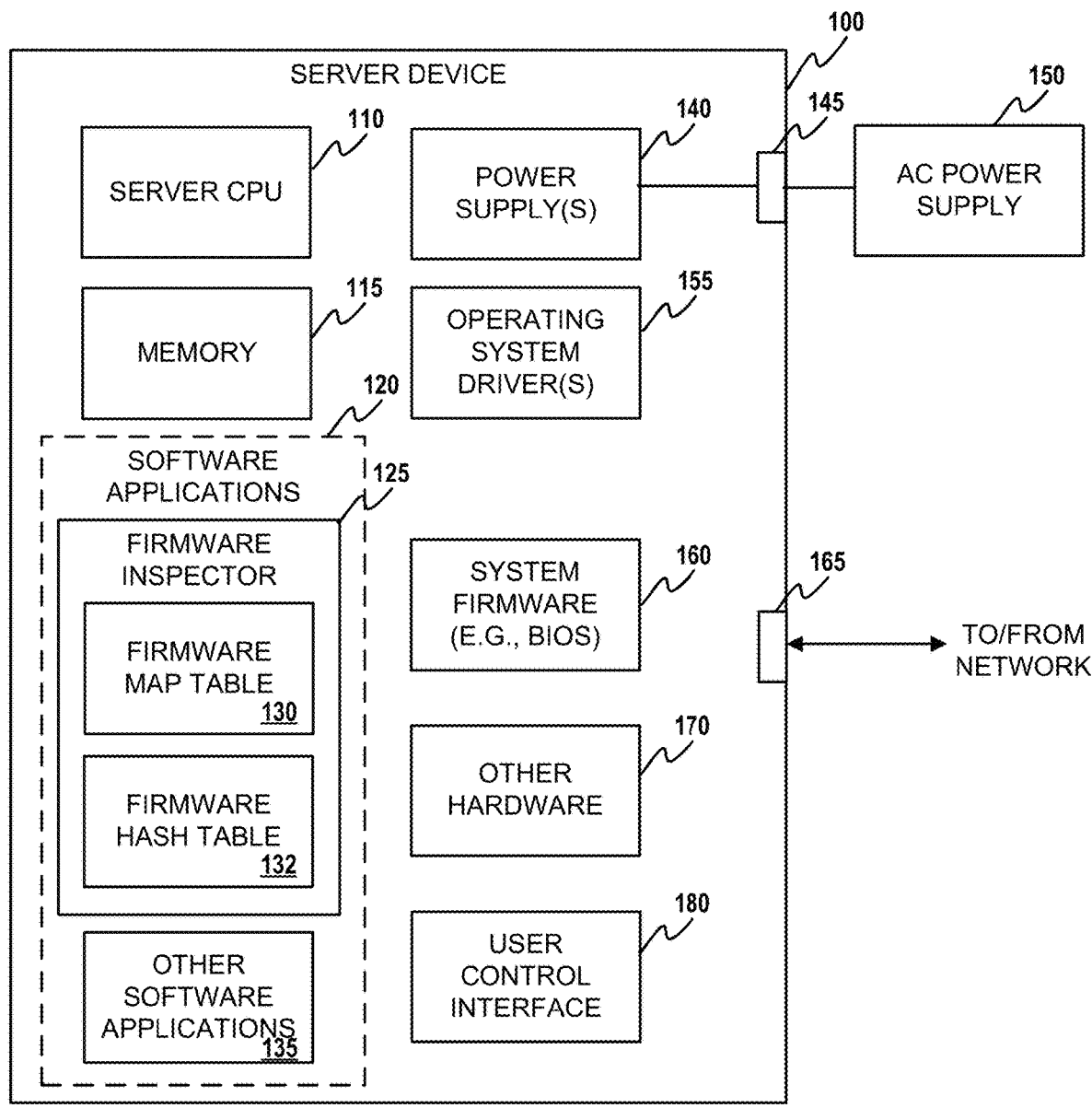

Referring now to FIG. 1, an example server device 100 is illustrated. The example server device 100 of FIG. 1 may be a standalone server such as a blade server, a storage server or a switch, for example. The server device 100 may utilize various software applications 120 to perform various functions associated with the computing device 100. The software applications 120 may be implemented in software, firmware and/or hardware. The software applications 120, in various examples, includes a firmware inspector module 125. The firmware inspector module 125 utilizes a firmware map table 130 and a firmware hash code table 132 in order to verify various system ROM components in the server device 100 or in other computing devices.

The example server device 100 may include a server CPU (central processing unit) 110, at least one memory device 115 and a power supply 140. The power supply 140 is coupled to an electrical interface 145 that is coupled to an external power supply such as an AC power supply 150. The server device 100 may also include an operating system component including, for example, an operating system driver component 155 and a system firmware component 160 such as, for example, a pre-boot BIOS (Basic Input/Output System) component stored in ROM (read only memory), and coupled to the CPU 110. In various examples, the CPU 110 may have a non-transitory memory device 115. In various examples, the memory device 115 may be integrally formed with the CPU 110 or may be an external memory device. The memory device 115 may include program code that may be executed by the CPU 110. For example, at least one process may be performed to execute a user control interface 180 and/or other software applications 135.

In various examples, the system firmware component 160 provides a pre-boot environment. The pre-boot environment allows applications, e.g., the software applications 180, and drivers, e.g., the operating system driver component 155, to be executed as part of a system bootstrap sequence, which may include the automatic loading of a pre-defined set of modules (e.g., drivers and applications). As an alternative to automatic loading, the bootstrap sequence, or a portion thereof, could be triggered by user intervention (e.g. by pressing a key on a keyboard) before the operating system driver 155 boots. The list of modules to be loaded may, in various examples, be hard-coded into system ROM. The example server device 100, after initial boot, will be controlled by the operating system component 155.

The server device 100 may also include a network interface 165 and other hardware 170 known to those skilled in the art. The network interface 165 may be coupled to a network such as an intranet, a local area network (LAN), a wireless local area network (WLAN), the Internet, etc.

The example firmware inspector module 125 determines a hash code for predetermined portions of the system ROM contained in the system firmware component 160 where the firmware map table 130 identifies these predetermined portions. The predetermined portions identified in the firmware map table 130 may be the same for every version of a specific ROM family whereas the hash codes may vary from version to version. If the predetermined portions change from version to version within a ROM family, the firmware map table 130 identifies separate predetermined portions for the different versions, as needed. In various examples, a SHA256 algorithm is used to calculate a hash code for a master binary image of each version of each system ROM family. Two hashes may be calculated including one hash code for the main ROM portion of the system firmware 160 and a second hash for a boot block section. In both cases, portions of the main ROM and boot block portion that are known to be variable (e.g., due to OEM specific code, user specific code or System Locked Pre-installation (SLP) code) are skipped. In other words, all static portions of the main ROM and boot block are grouped into separate binary images upon which a hash code is calculated while the variable portions are omitted. System Locked Pre-installation (SLP), is a procedure used by OEM computer manufacturers to pre-activate operating systems such as Microsoft's Windows XP®, Windows Server 2003® and Windows Vista® before mass distribution.

The firmware inspector module 125 determines a first set of master hash codes based on a master system ROM (e.g., in the production line) and these master hash codes are embedded in the firmware hash table 132. When checking a specific system version of a ROM family for tampering, the firmware inspector module 125 determines a second set of hash codes, verification hash codes, based on a binary image created from a certain version of a ROM family on a specific server device 100 and compares the second set of verification hash codes to the first set of master hash codes previously calculated for the certain version of the ROM family and embedded in the firmware hash table 132. If the hash codes agree, it may safely be determined that the system firmware 160 has not been altered from the master system ROM. If the hash codes do not agree, the firmware inspector module 125 generates a signal that the system firmware 160 may have been tampered with and the entire system firmware may be downloaded to memory for inspection. The downloaded copy of the system firmware 160 may be saved in a file that includes a serial number of the server device 100 that may have been tampered with.

The firmware inspector module 125 may be run periodically, when system updates are made, or may be chosen to be run manually by a user. The server device 100 may be a cloud device that uploads system firmware from another computing device and performs the firmware inspection remotely.

In some instances, the firmware map table 130 may not include a correct firmware map for a given ROM family and/or version of system firmware 160. In this case, the firmware inspector module 125 may indicate that no matching system ROM and associated hash codes are available in the firmware map table 130 or the firmware hash table 132, respectively, and that a validation of the system firmware 160 was not made. In this case, the firmware inspector module 125 may dump a copy of the full ROM images of the system firmware 160 into binary files for inspection using a system serial number as part of the filename.

Figure 2:
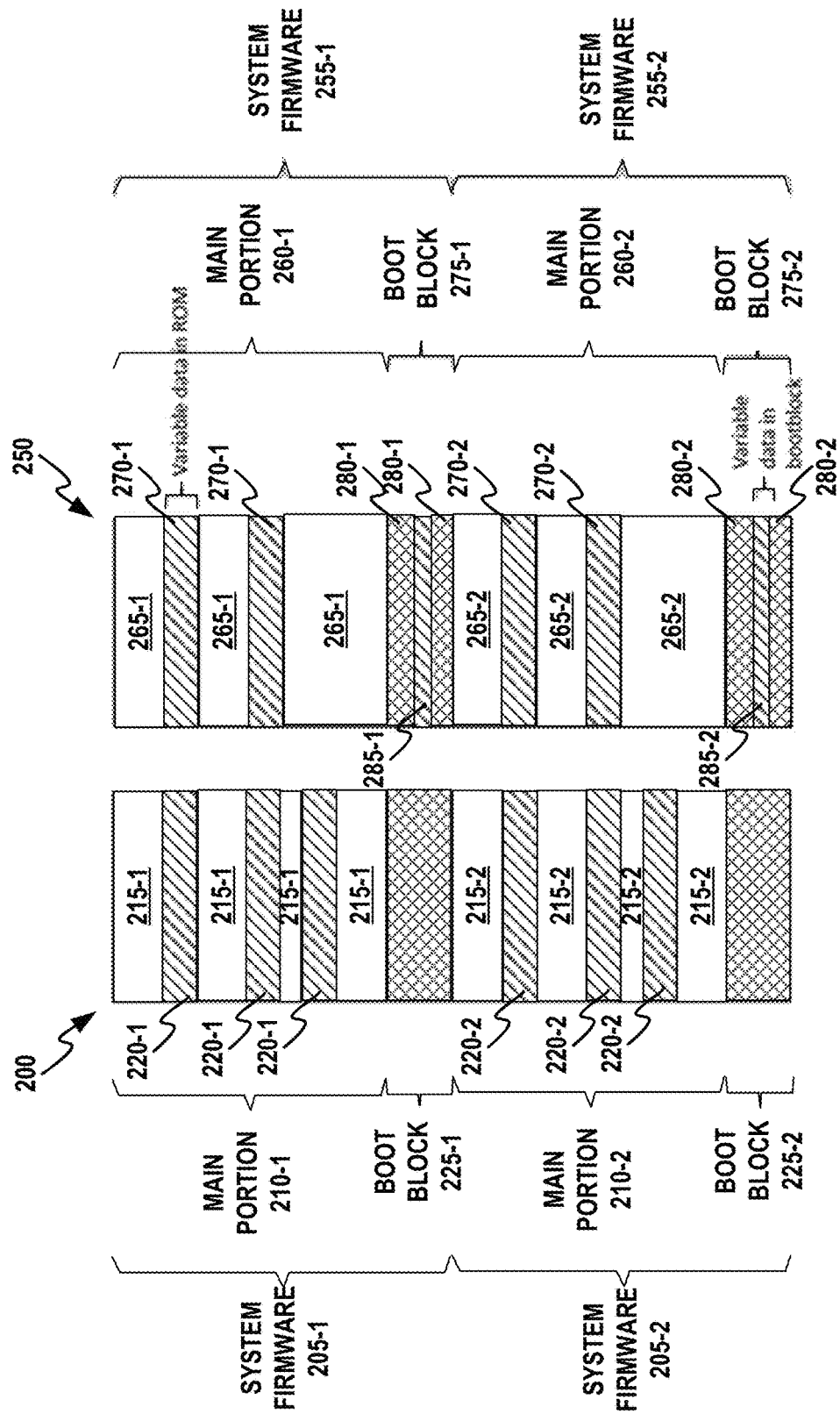
FIG. 2 illustrates block diagram illustrations of example layouts of portions of system ROM firmware.

FIG. 2 illustrates block diagram illustrations of example layouts of portions of system ROM firmware. The block diagrams in FIG. 2 are exemplary only. Referring to FIG. 2, a first ROM memory block diagram 200 includes a pair of system firmware ROM 205-1 and 205-2. The system firmware ROMs 205-1 and 205-2 may be duplicates of each other such that redundancy is provided.

The first and second system firmware ROMs 205-1 and 205-2 are each comprised of a main ROM portion 210-1 and 210-2 and a boot block portion 225-1 and 225-2. The main ROM portions 210-1 and 210-2, in this example, are comprised of four static portions 215-1 and 215-2 and three variable portions 220-1 and 220-2. The variable portions 220-1 and 220-2 may include code that varies from device to device, depending on OEM specific code, user specific code, SLP code, etc.

FIG. 2 illustrates a second example ROM memory block diagram 250 which also includes a pair of system firmware ROM 255-1 and 255-2. The system firmware ROMs 255-1 and 255-2 may be duplicates of each other such that redundancy is provided. The first and second system firmware ROMs 255-1 and 255-2 are each comprised of a main ROM portion 260-1 and 260-2 and a boot block portion 275-1 and 275-2. The main ROM portions 260-1 and 260-2, in this example, are comprised of three static portions 265-1 and 265-2 and two variable portions 270-1 and 270-2. The variable portions 270-1 and 270-2 may include code that varies from device to device, depending on OEM specific code, user specific code, SLP code, etc.

In contrast to the boot block portions 225-1 and 225-2 of the first example ROM memory block diagram 200, the boot block portions 275-1 and 275-2 each include two static portions 280-1 and 280-2 and one variable portion 285-1 and 285-2. The first and second example ROM memory block diagrams 200 and 250 of FIG. 2 are examples and other example ROM memories may include more or fewer static and/or variable portions than those illustrated.

In order to identify which portions of a given ROM memory are static portions and which are variable, the firmware map table 130 of FIG. 1 may list start and stop addresses for each portion and may classify each portion as being either a static portion to be included in the hash code calculation made by the firmware inspector module 125, or a variable portion to be omitted from the hash code calculations. Using this information, the firmware inspector module 125 may group only the static portions together, calculate a hash code and compare the hash code to a master hash code stored in the hash code table 132 in association with the firmware map table 130. The firmware map table 130 may include firmware maps for multiple ROM memory structures, each firmware map indicating which portions of the ROM memory structure are static, to be included in the hash code calculations, and which portions of the ROM memory structure are variable and should be omitted from the hash code calculations. Static portions of firmware include portions that remain unchanged over a normal lifetime of the system firmware, while the variable portions of the system firmware may vary over the normal lifetime of the system firmware from development at individual OEMs to installation at a specific user server device.

The firmware map table 130 may also indicate which static and/or variable portions of the ROM memory are part of the main ROM and which are portions of a boot block, or other portion of ROM. In this way, the firmware inspector module 125 may identify the main ROM static portions and calculate a first hash code, identify the boot block static portions (and/or other portion of ROM for which a hash code comparison may be made) and calculate a second hash code and then compare the first and second hash codes to first and second master hash codes previously calculated for an official version of the specific ROM memory and stored in the firmware hash table 132 in association with the specific ROM memory address entries stored in the firmware table map 130 for a certain ROM family. Multiple sets of the master hash codes, one for each version of system ROM in a ROM family, may be stored in the firmware hash table 132 and these master hash codes may differ for each version of system ROM in the ROM family.

Figure 3:
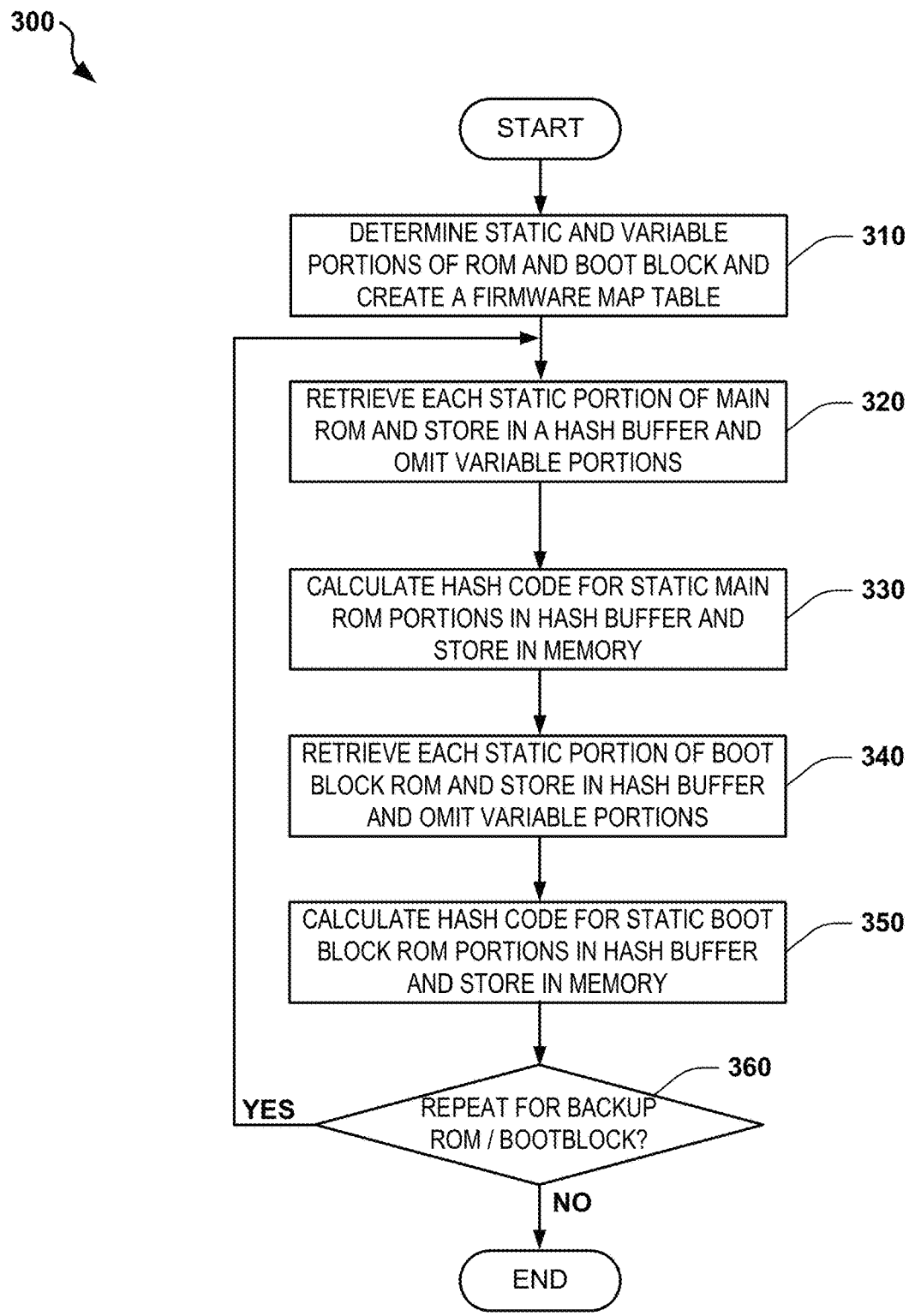
FIG. 3 illustrates an example flow diagram for an example process for calculating master hash codes for verifying firmware.

Referring now to FIG. 3, an example flow diagram for an example process 300 for calculating master hash codes to be used later for verifying firmware is shown. The process 300 is exemplary only and may be modified. The example process 300 of FIG. 3 will now be described with further references to FIG. 1.

At block 310, a determination is made as to which portions of the system firmware 160 are static and which portions are variable. This determination may be made manually and embedded into the firmware map table 130 as data indicative of a set of memory addresses (e.g., hexadecimal addresses) listing the starting and stopping points of both the static portions and the variable portions and data indicative of whether each portion is static or variable. Alternatively, the determination of static and variable portions at block 310 may be automated to be performed by the firmware inspector module 125. The static and variable portions may, in various examples, be consistent across all versions of firmware within a ROM family. In these examples, a single set of addresses may suffice for all versions. Alternatively, some versions of a ROM family may have different static and or variable portions and, in these examples, two or more sets of address may be embedded into the firmware map table 130.

At block 320, the firmware inspector module 125 retrieves portions of the main ROM of the system firmware 160 indicated by the firmware map table 130 generated at block 310 to be static portions and omits retrieval of the main ROM portions indicated to be variable. The static portions may be combined to form a combined portion upon which a master hash code may be calculated. The combined portion may be formed by placing the static portions back to back based on an address location, or in any other predetermined order.

At block 330, the firmware inspector module 125 calculates a first master hash code for the combined portion of the main ROM using an algorithm such as, in various examples, the SHA256 algorithm. The firmware inspector module 125 stores the first master hash code in the firmware hash table 132 in association with the firmware map table entries determined at block 310. This first master hash code may be used at a later date to verify that another main ROM of a deployed version of the system firmware 160 has not been hacked or otherwise corrupted.

At block 340, the firmware inspector module 125 retrieves portions of the boot block ROM of the system firmware 160 indicated by the firmware map table 130 generated at block 310 to be static portions and omits retrieval of the boot block ROM portions indicated to be variable. The static portions may be combined to form a combined portion upon which a master hash code may be calculated. The combined portion may be formed by placing the static portions back to back based on an address location, or in any other predetermined order.

At block 350, the firmware inspector module 125 calculates a second master hash code for the combined portion of the boot block ROM using an algorithm such as, in various examples, the SHA256 algorithm. The firmware inspector module 125 stores the second master hash code in the firmware hash table 132 association with the firmware map table entries determined at block 310. This second master hash code may be used at a later date to verify that another boot block ROM of a deployed version of the system firmware 160 has not been hacked or otherwise corrupted.

At decision block 360, the firmware inspector module determines if there are other main ROM and/or other boot block ROM portions of the system firmware 160 for which other master hash codes may be calculated. For example, in various examples, as illustrated by the ROM system block diagrams 200 and 250 of FIG. 2, there may be two main ROM portions and two boot block portions in a single system firmware. If it is determined that more main ROM and/or more boot block portions of the system firmware remain, the process 300 may return to repeat the actions of blocks 320, 330, 340 and 350, as often as needed. In addition, if other versions of a ROM family exist, the actions at block 320, 330, 340 and 350 may also be repeated for all versions of the ROM family that have static and variable portions that adhere to the firmware map table entries determined at block 310. If it is determined that no more portions of system firmware or other versions of firmware in the same ROM family remain, the process 300 may end.

The firmware map table 130 and firmware hash table 132 developed using the process 300, including the static and variable portions addresses as well as the master hash codes, may be embedded in firmware inspector modules 125 of other server devices for later use in verifying the authenticity of the system firmware of the other server devices or for verifying the authenticity of remote server devices using a cloud based server device.

Figure 4:
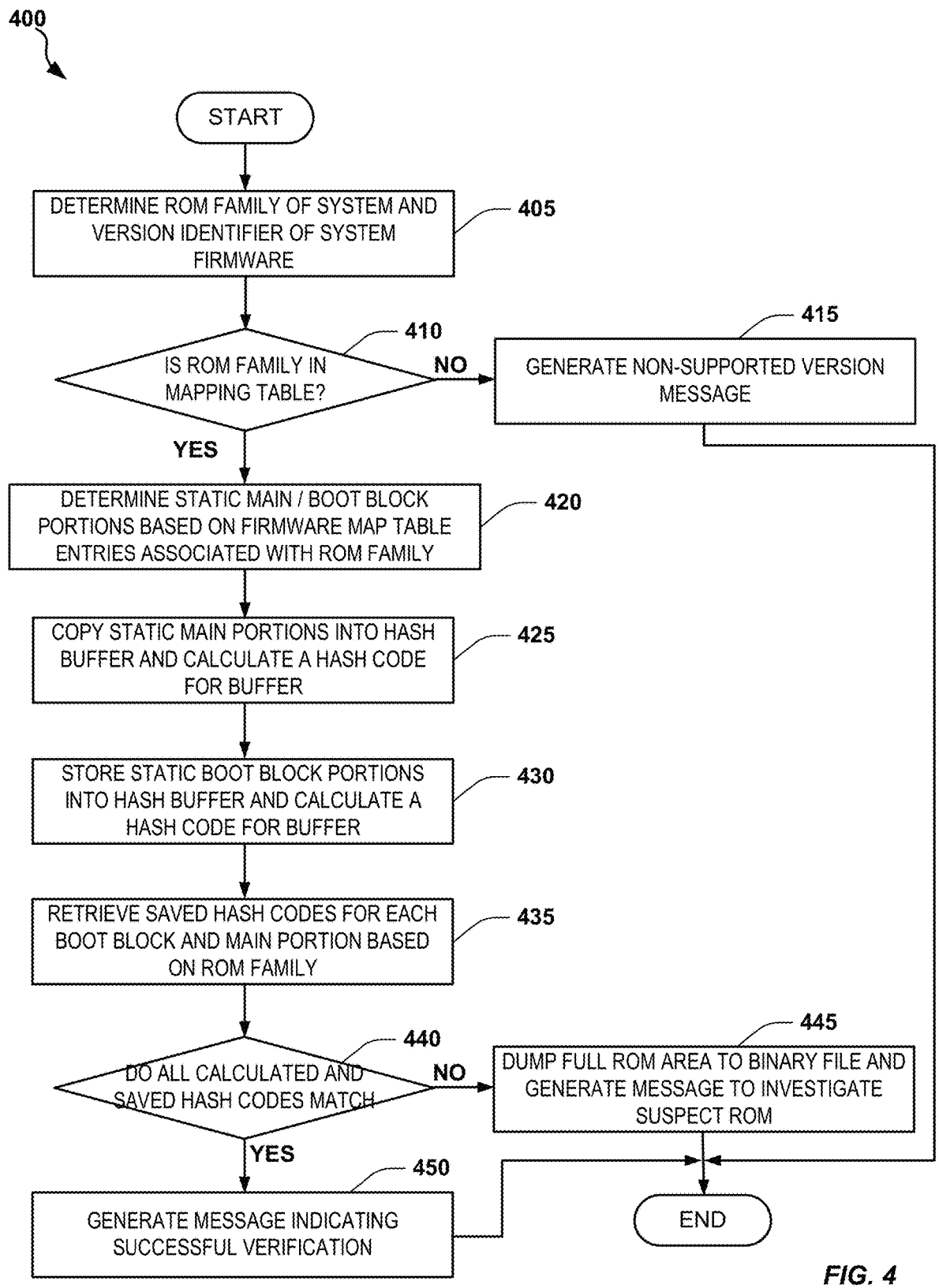
FIG. 4 illustrates an example flow diagram for an example process for determining status of firmware of a system utilizing the master hash codes calculated using the process of FIG. 3.

Referring now to FIG. 4, an example process 400 for determining status of firmware of a system utilizing the master hash codes calculated using the process of FIG. 3 and embedded in the firmware hash table 132 is shown. The process 400 is exemplary only and may be modified. The example process 400 of FIG. 4 will now be described with further references to FIG. 1.

At block 405, the firmware inspector module 125 determines, for a server device 100 or other computing device (referred to from herein as the computing device), a ROM family of a system firmware 160 and possibly a version number of the system firmware 160 of the computing device. Based on the ROM family and possibly the version number, the firmware inspector module 125 searches for a corresponding ROM family and possibly version number for a firmware map contained in the firmware map table 130, decision block 410.

The search at decision block 410 may be made for each main ROM portion and/or boot block portion of the system firmware 160. If any corresponding ROM family and possibly version number for any of the main ROM and/or boot block portion is not found in the firmware MAP table 130, the process continues to block 415, where the firmware inspector module 125 generates a warning message indicating that a main ROM and/or boot block version is not supported by the firmware map table 130 or a message indicating that the ROM family and possibly version number could not be validated using data in the firmware map table 130. The process 400 may then end.

At block 420, the firmware inspector module 125 determines which portions of the main ROM and/or boot block portions of the system firmware 160 are static portions based on the data contained in the firmware map table 130 for the identified ROM family and possibly version number.

At block 425, the firmware inspector module 125 retrieves copies of the static portions of the main ROM portions of the system firmware 160 of the computing device based on the address entries in the firmware map table 130 and copies the static portions into a hash code buffer and calculates first verification hash codes for each main ROM portion of the system firmware 160.

At block 430, the firmware inspector module 125 retrieves copies of the static portions of the boot block portions of the system firmware 160 of the computing device based on the address entries in the firmware map table 130 and copies these static portions into a hash code buffer and calculates second verification hash codes for each boot block portion of the system firmware 160.

At block 435, the firmware inspector module 125 retrieves master hash codes embedded in the firmware hash table 132 in association with the firmware map data contained in the firmware map table 130 for the identified ROM family and possibly version number. At decision block 440, the firmware inspector module 125 determines if any of the verification hash codes calculated at blocks 425 or 430 do not match the associated master hash codes retrieved at block 435. If any of the verification hash codes do not match the associated master hash code, this is an indication that the static portions of the system firmware 160 have changed from the official version upon which the master hash codes were determined, and the firmware inspector module 125 dumps the full ROM area of the system firmware 160 into a binary file of the memory 115, or other memory, and generates a message to investigate the suspect ROM, block 445.

If all verification hash codes match respective master hash codes at decision block 440, the firmware inspector module 125 generates a message indicating successful verification of all static ROM portions in the system firmware 160, block 450. The process 400 may then end.

Various examples described herein are described in the general context of method steps or processes, which may be implemented in one example by a software program product or component, embodied in a machine-readable medium, including executable instructions, such as program code, executed by entities in networked environments. Generally, program modules may include routines, programs, objects, components, data structures, etc. which may be designed to perform particular tasks or implement particular abstract data types. Executable instructions, associated data structures, and program modules represent examples of program code for executing steps of the methods disclosed herein. The particular sequence of such executable instructions or associated data structures represents examples of corresponding acts for implementing the functions described in such steps or processes.

Software implementations of various examples can be accomplished with standard programming techniques with rule-based logic and other logic to accomplish various database searching steps or processes, correlation steps or processes, comparison steps or processes and decision steps or processes.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A method, comprising:
   retrieving, from a computing device utilizing a copy of a system firmware on a memory, copies of first portions of the system firmware while omitting retrieval of copies of the second portions to form a combined copy of the first portions, wherein the first portions remain unchanged over a normal lifetime of the system firmware and the second portions of the system firmware may vary over the normal lifetime of the system firmware;
   calculating, by a firmware inspector executing using at least one processor, at least one verification hash code based on the combined copy of the first portions;
   determining, by the firmware inspector, based on a comparison of the at least one verification hash code to at least one master hash code, whether a change has occurred in the copies of the first portions compared to the first portions upon which the at least one master hash code was based,
   wherein the at least one master hash code is determined from a memory on a master system including corresponding master system firmware and wherein the at least one master hash code is based on a combined portion of corresponding first portions of the master system firmware that remain unchanged over a normal lifetime of the master system firmware while omitting second portions of the master system firmware, wherein the copy of the system firmware corresponds to the master system firmware; and
   performing, by the firmware inspector, an action in response to the determination of whether the change has occurred.

2. The method of claim 1, further comprising:
   calculating the at least one master hash code based on the combined first portions of the master system firmware; and
   storing the at least one master hash code in a hash code table in association with a firmware map data.

3. The method of claim 1, further comprising:
   comparing the at least one verification hash code to the at least one master hash code.

4. The method of claim 2, wherein the firmware map data being indicative of the second portions of the system firmware that may vary over the normal lifetime of the system firmware.

5. The method of claim 2, wherein, the at least one master hash code includes a first master hash code and a second master hash code, the method further comprising:
- calculating the first master hash code based on the identified first portions contained in a main portion of the system firmware; and
- calculating the second master hash code based on the identified first portions contained in a boot block portion of the system firmware.

6. The method of claim 1, wherein, if it is determined that the copies of the first portions retrieved from the computing device have changed from the first portions upon which the master hash code was based, as part of the action, the method further comprises:
- storing a copy of the system firmware of the computing device to a memory; and
- generating a message indicating that changes in the system firmware of the computing device have occurred.

7. The method of claim 1, wherein the second portions include data including at least one of System Locked Pre-installation (SLP) data, original equipment manufacturer (OEM) data and user defined default data.

8. The method of claim 1, further comprising:
- generating, as part of the action, a message indicating a successful verification based on the comparison.

\* \* \* \* \*